(12) United States Patent
Redestig

(10) Patent No.: US 7,197,619 B2
(45) Date of Patent: Mar. 27, 2007

(54) METHODS, SYSTEMS, AND COMPUTER PROGRAM PRODUCTS FOR MANAGING A MEMORY BY STORING EXTERNAL OBJECTS IN A DYNAMIC HEAP

(75) Inventor: Johan Redestig, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 366 days.

(21) Appl. No.: 10/864,278

(22) Filed: Jun. 9, 2004

(65) Prior Publication Data

US 2005/0278496 A1     Dec. 15, 2005

(51) Int. Cl.
*G06F 12/02* (2006.01)

(52) U.S. Cl. ............... 711/170; 711/171; 711/172; 711/173

(58) Field of Classification Search ............ None
See application file for complete search history.

(56) References Cited

U.S. PATENT DOCUMENTS

| | | | | |
|---|---|---|---|---|
| 6,081,665 A | * | 6/2000 | Nilsen et al. | 717/116 |
| 6,691,050 B2 | * | 2/2004 | Stark | 702/66 |
| 6,816,956 B1 | * | 11/2004 | Benayon et al. | 711/170 |

* cited by examiner

*Primary Examiner*—T Nguyen
(74) *Attorney, Agent, or Firm*—Myers Bigel Sibley & Sajovec, PA

(57) ABSTRACT

A memory is managed by defining a heap in the memory that includes a static heap and a dynamic heap. All objects that are external objects are stored in the dynamic heap. An external object is an object that includes no pointer to another object.

22 Claims, 4 Drawing Sheets

METHODS, SYSTEMS, AND COMPUTER PROGRAM PRODUCTS FOR MANAGING A MEMORY BY STORING EXTERNAL OBJECTS IN A DYNAMIC HEAP

BACKGROUND OF THE INVENTION

The present invention relates to data processing systems, and, more particularly, to methods, systems, and computer program products for managing memory usage in a data processing system.

Operating systems, such as the Java operating system developed by Sun Microsystems of Mountain View, Calif., may manage the use of a memory through use of a heap. The Java operating system, for example, may use both a static heap and a dynamic heap. The static heap may be a portion of memory that is allocated before applications execute. Memory from the static heap may then be allocated to store objects and other runtime data that the applications need. Unfortunately, to determine how much memory to assign to the static heap, it is necessary to estimate how much memory the applications may need, which may be very difficult. For this reason, a static heap may be engineered conservatively with more memory being allocated to the static heap that is typically necessary. This may result in wasted memory when applications do not require as much memory as has been engineered into a static heap. Static heaps do offer advantages, however, in being relatively simple to implement and in providing generally good reliability.

A dynamic heap approach is based on more advanced heap management technology. In a dynamic heap, a memory manager allocates an initial block of memory for the dynamic heap and, if this memory is insufficient to meet the needs of the applications, then additional memory blocks may be allocated to dynamic heap for use by the applications. Management of a dynamic heap involves garbage collection, which refers to the recycling of dynamically allocated memory, and compaction. Thus, while a dynamic heap may provide relatively efficient use of memory, management of a dynamic heap is generally more complex than management of a static heap.

SUMMARY OF THE INVENTION

According to some embodiments of the present invention, a memory is managed by defining a heap in the memory that includes a static heap and a dynamic heap. All objects that are external objects are stored in the dynamic heap. An external object is an object that includes no pointer to another object.

In other embodiments of the present invention, the external object is an object that includes no pointer to another object and has a size greater than a threshold. The threshold may be about 10 kBytes.

In still other embodiments of the present invention, the external object further includes data of type int, short int, long int, unsigned int, float, double, char, and/or unsigned char.

In still other embodiments of the present invention, all objects that are not external objects are stored in the static heap.

In further embodiments of the present invention, a data processing system includes a memory and a static heap and a dynamic heap that are disposed in the memory. A heap manager is disposed in the memory that is configured to store all objects that are external objects in the dynamic heap. An external object is an object that comprises no pointer to another object.

In still further embodiments of the present invention, the heap manager is further configured to store all objects that are not external objects in the static heap.

In still further embodiments of the present invention, the data processing system comprises a mobile terminal.

In other embodiments of the present invention, a data processing system includes means for defining a heap in a memory that includes a static heap and a dynamic heap. The data processing system further includes means for storing all objects that are external objects in the dynamic heap. An external object is an object that comprises no pointer to another object.

In still other embodiments of the present invention, the system further comprises means for storing all objects that are not external objects in the static heap.

In still other embodiments of the present invention, the data processing system comprises a mobile terminal.

In further embodiments of the present invention, a computer program product for managing a memory includes a computer readable storage medium having computer readable program code embodied therein. The computer readable program code comprises computer readable program code configured to define a heap in a memory that includes a static heap and a dynamic heap. The computer program product further comprises computer readable program code configured to store all objects that are external objects in the dynamic heap. An external object is an object that includes no pointer to another object.

In still further embodiments of the present invention, the computer program product further comprises computer readable program code configured to store all objects that are not external objects in the static heap.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
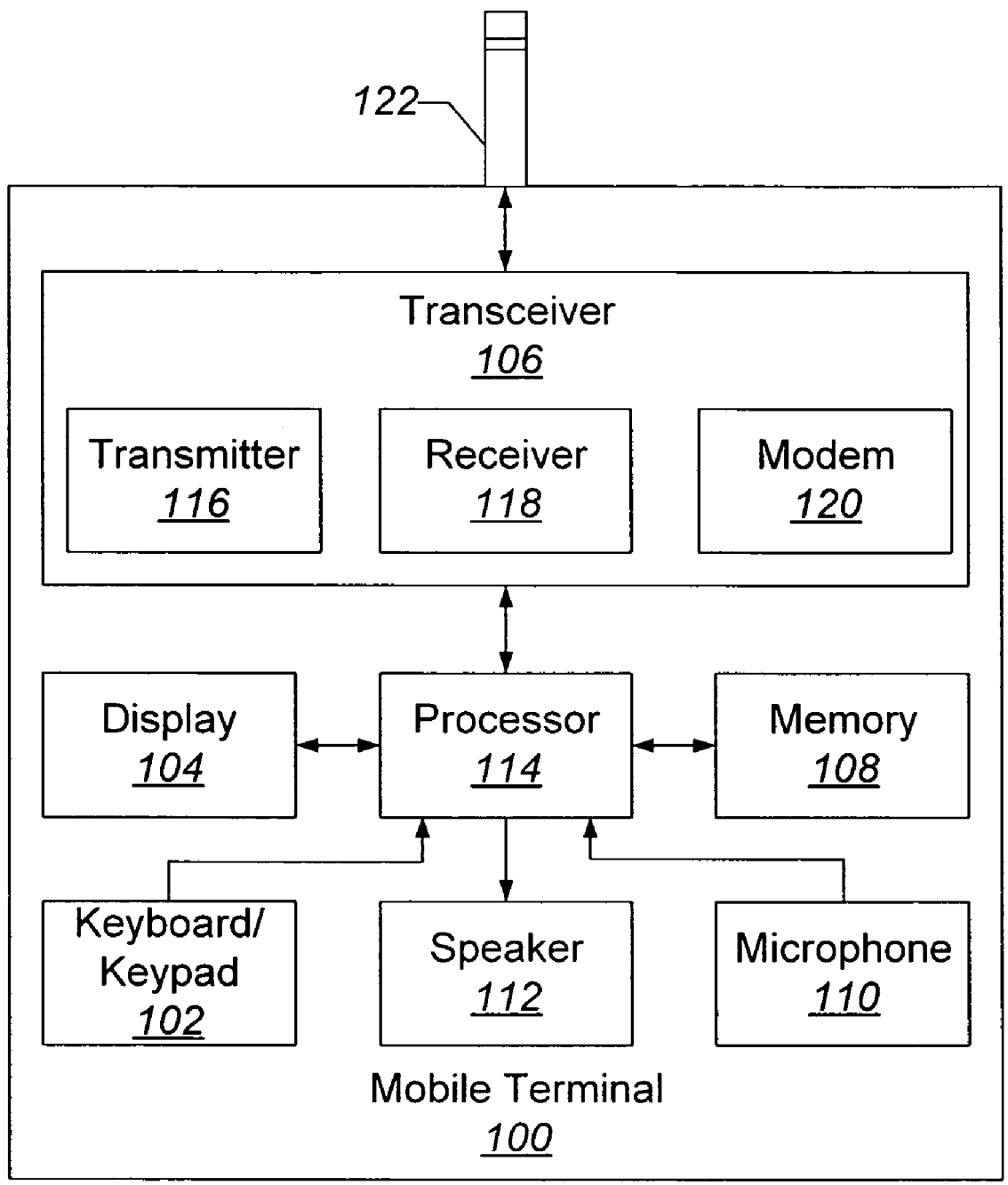
FIG. 1 is a block diagram that illustrates a mobile terminal in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. As used herein, the term "and/or" includes any and all combinations of one or more of the associated listed items. Furthermore, as used herein, the term "object" means a continuous block of memory that forms a single logical structure. No relationship to an object-oriented software system is implied.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

For purposes of illustration, embodiments of the present invention are described herein in the context of managing memory in a mobile terminal running the Java operating system. It will be understood, however, that the present invention may be embodied in other types of electronic devices and data processing systems running the Java operating system or other operating systems that use both a static and dynamic heap. Moreover, as used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Referring now to FIG. 1 an exemplary mobile terminal 100, in accordance with some embodiments of the present invention, includes a keyboard/keypad 102, a display 104, a transceiver 106, a memory 108, a microphone 110, and a speaker 112 that communicate with a processor 114. The transceiver 106 typically includes a transmitter circuit 116, a receiver circuit 118, and a modem 120, which cooperate to transmit and receive radio frequency signals to base station transceivers via an antenna 122. The radio frequency signals transmitted between the mobile terminal 100 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 100 may be included in many conventional mobile terminals and their functionality is generally known to those skilled in the art.

Figure 2:
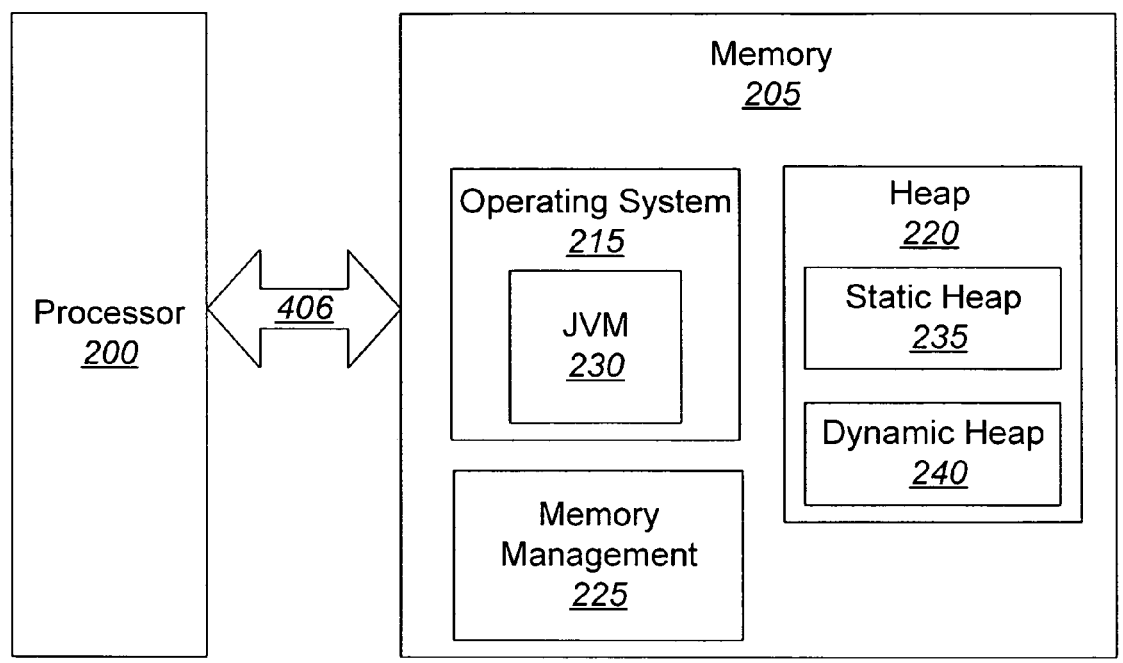
FIG. 2 is a block diagram that illustrates a hardware/software architecture that may be used in data processing systems and/or electronic devices, such as the mobile terminal of FIG. 1, in accordance with some embodiments of the present invention.

FIG. 2 illustrates a processor 200 and memory 205 that may be used in embodiments of mobile terminals, such as the mobile terminal 100 of FIG. 1, and/or other electronic devices and data processing systems. The processor 200 and memory 205 comprise a data processing system that may be used to manage a memory by storing external objects in a dynamic heap as will be described in detail hereafter. The processor 200 communicates with the memory 205 via an address/data bus 210. The processor 200 may be, for example, a commercially available or custom microprocessor. The memory 205 is representative of the one or more memory devices containing the software and data used to facilitate memory management in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to three or more categories of software and/or data: an operating system 215, a heap 220, and a memory management module 225. The operating system 215 may be, for example, the Java operating system, which has been developed by Sun Microsystems, Mountain View, Calif. The operating system 215 may manage the data processing system's software and/or hardware resources and may coordinate execution of programs by the processor 200. Java is a portable and architecturally neutral language. Java source code is compiled into a machine independent format that may be run on machines configured with a Java runtime system known as a Java Virtual Machine (JVM) module 230. The JVM is defined as an imaginary machine that is implemented by emulating a processor through the use of software on a real machine. Accordingly, machines running under diverse operating systems, including UNIX and Windows NT, having a JVM can execute the same Java program.

The heap 220 includes a static heap 235 and a dynamic heap 240. The static heap 235 may be used to define a set of amount of storage for use by applications before any applications execute on the processor 200. The size of the static heap 235 is not dynamically varied based on the size of the objects stored therein. Memory from the dynamic heap 240, however, may be dynamically allocated and deallocated based on the needs of the applications during execution. The memory management module 225 manages the static heap 235 and the dynamic heap 240. In particular, the memory management module 225 may determine whether an object is stored in the static heap 235 or the dynamic heap 240. In analyzing various types of applications, it has been found that the objects that often require the most memory are objects that comprise no pointers to other objects. Examples of these types of objects include data structures of primitive types, such as, for example, int, short int, long int, unsigned int, float, double, char, and/or unsigned char. These objects that comprise no pointer to another object may be called external objects.

According to some embodiments of the present invention, the memory management module 225 may store external objects in the dynamic heap 240 where they may be deallocated via a garbage collection and memory compaction function provided by the memory management module 225 when these external objects are no longer reachable and/or alive. Because the external objects contain no pointers to other objects, the garbage collection function need not be concerned that deallocating such external objects may affect other objects that have not been deallocated. Advantageously, less memory may be allocated to the static heap 235 as the static heap 235 is generally used to store smaller sized objects. In addition, when the external objects are no longer reachable and/or alive, the memory management module 225 may recycle that memory space through use of a garbage collection and/or memory compaction function, which may result in more efficient use of the memory 205.

Although FIG. 2 illustrates an exemplary hardware/software architecture that may be used in mobile terminals, electronic devices, data processing systems, and the like for managing a memory, it will be understood that the present invention is not limited to such a configuration but is intended to encompass any configuration capable of carrying out operations described herein. Moreover, the functionality of the hardware/software architecture of FIG. 2 may be implemented as a single processor system, a multi-processor system, or even a network of stand-alone computer systems, in accordance with various embodiments of the present invention.

Computer program code for carrying out operations of systems discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention.

These flowchart and/or block diagrams further illustrate exemplary operations of managing a memory in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
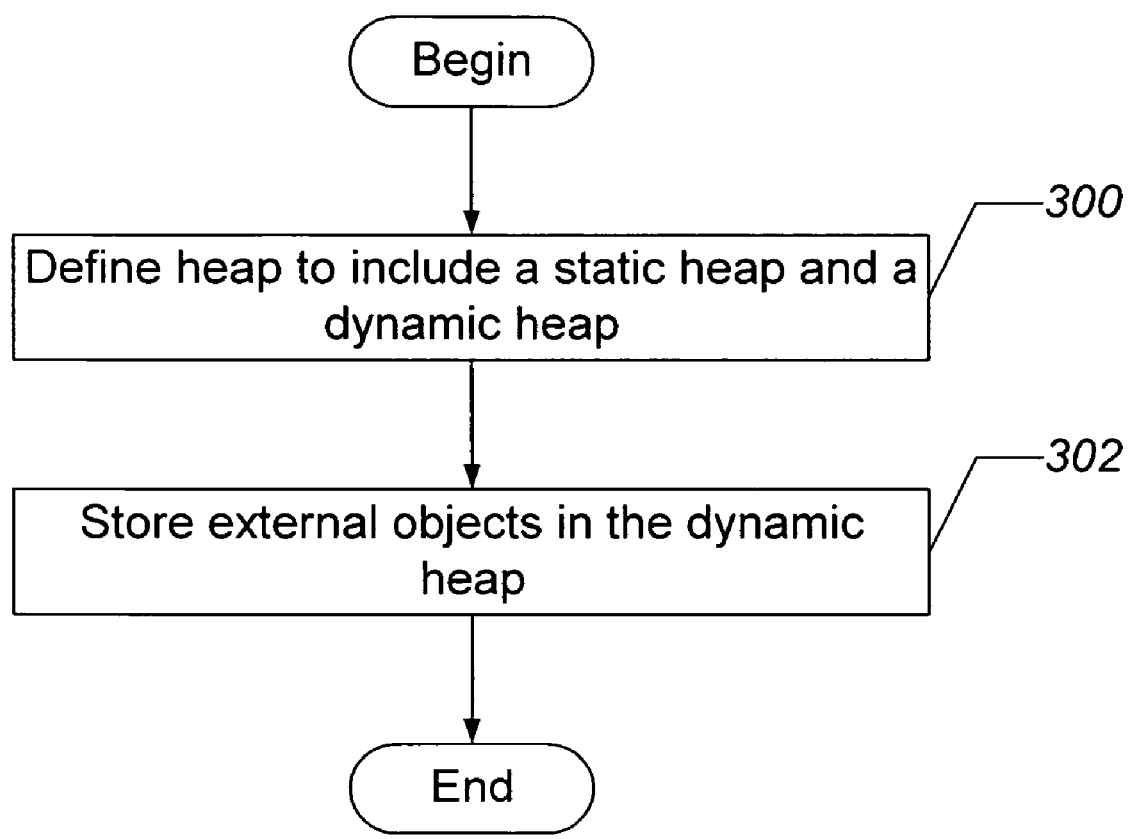
FIGS. 3 and 4 are flowcharts that illustrate operations for managing a memory in accordance with some embodiments of the present invention.

Referring now to FIGS. 3 and 2, operations for managing a memory, in accordance with some embodiments of the present invention, begin at block 300 where the heap 220 is defined in the memory 205 to include both a static heap 235 and a dynamic heap 240. At block 302, the memory management module 225 stores all objects that are external objects in the dynamic heap 240. In accordance with other embodiments of the present invention, the memory management module 225 may store all objects that are not external objects in the static heap 235.

Figure 4:
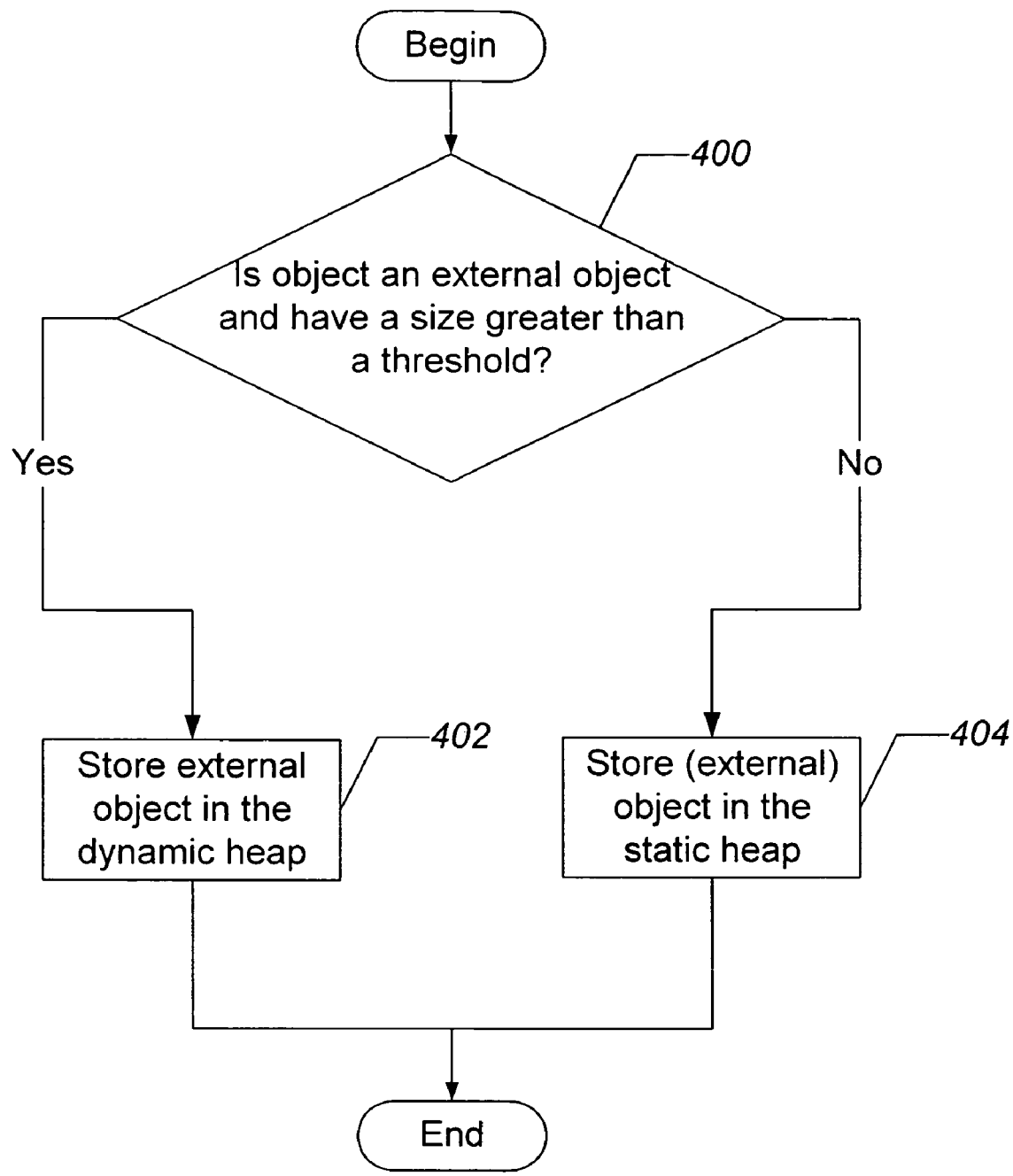

Referring now to FIGS. 4 and 2, operations for managing a memory, in accordance with further embodiments of the present invention will now be described. In accordance with some embodiments of the present invention, not all external objects may be stored in the dynamic heap 240. As it is generally desirable to reserve the dynamic heap 240 for larger external objects, a determination may be made at block 400 whether an object is an external object and also has a size greater than a threshold. If the object is an external object and has a size greater than the threshold, then the memory management module 225 stores the object in the dynamic heap 240 at block 402. Otherwise, the memory management module 225 stores the object in the static heap at block 404. In accordance with some embodiments of the present invention, the threshold used at block 400 may be about 10 kBytes.

Advantageously, embodiments of the present invention may manage a memory with improved efficiency by storing external objects, which typically require more memory space, but do not reference other objects, in a dynamic heap and storing other objects in the static heap. Thus, the simplicity and reliability benefits of the static heap may be realized along with the efficiency benefits of the dynamic heap. Moreover, embodiments of the present invention may be particularly advantageous in mobile terminals, data processing systems, and/or electronic devices in which memory is a relatively scarce resource as less overall memory may be required because larger objects (external objects) are stored in the dynamic heap where the memory is recycled when objects are unreachable and/or no longer alive. Such reductions in memory requirements may also be financially advantageous.

The flowcharts of FIGS. 3 and 4 illustrate the architecture, functionality, and operations of embodiments of methods, systems, mobile terminals, electronic devices, and/or computer program products for managing a memory. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of managing a memory, comprising:
    defining a heap in the memory that comprises a static heap and a dynamic heap; and
    storing all objects that are external objects in the dynamic heap, an external object being an object that comprises no pointer to another object.

2. The method of claim 1, wherein the external object is an object that comprises no pointer to another object and has a size greater than a threshold.

3. The method of claim 2, wherein the threshold is about 10 kBytes.

4. The method of claim 1, wherein the external object further comprises data of type int, short int, long int, unsigned int, float, double, char, and/or unsigned char.

5. The method of claim 1, further comprising:
    storing all objects that are not external objects in the static heap.

6. A data processing system, comprising:
    a memory;
    a static heap and a dynamic heap disposed in the memory; and
    a heap manager disposed in the memory, the heap manager being configured to store all objects that are external objects in the dynamic heap, an external object being an object that comprises no pointer to another object.

7. The system of claim 6, wherein the external object is an object that comprises no pointer to another object and has a size greater than a threshold.

8. The system of claim 7, wherein the threshold is about 10 kBytes.

9. The system of claim 6, wherein the external object further comprises data of type int, short int, long int, unsigned int, float, double, char, and/or unsigned char.

10. The system of claim 6, wherein the heap manager is further configured to store all objects that are not external objects in the static heap.

11. The system of claim 6, wherein the data processing system comprises a mobile terminal.

12. A data processing system, comprising:
    means for defining a heap in a memory that comprises a static heap and a dynamic heap; and
    means for storing all objects that are external objects in the dynamic heap, an external object being an object that comprises no pointer to another object.

13. The system of claim 12, wherein the external object is an object that comprises no pointer to another object and has a size greater than a threshold.

14. The system of claim 13, wherein the threshold is about 10 kBytes.

15. The system of claim 12, wherein the external object further comprises data of type int, short int, long int, unsigned int, float, double, char, and/or unsigned char.

16. The system of claim 12, further comprising:
    means for storing all objects that are not external objects in the static heap.

17. The system of claim 12, wherein the data processing system comprises a mobile terminal.

18. A computer program product for managing a memory, comprising:
    a computer readable storage medium having computer readable program code embodied therein, the computer readable program code comprising:
    computer readable program code configured to define a heap in a memory that comprises a static heap and a dynamic heap; and
    computer readable program code configured to store all objects that are external objects in the dynamic heap, an external object being an object that comprises no pointer to another object.

19. The computer program product of claim 18, wherein the external object is an object that comprises no pointer to another object and has a size greater than a threshold.

20. The computer program product of claim 19, wherein the threshold is about 10 kBytes.

21. The computer program product of claim 18, wherein the external object further comprises data of type int, short int, long int, unsigned int, float, double, char, and/or unsigned char.

22. The computer program product of claim 18, further comprising:
    computer readable program code configured to store all objects that are not external objects in the static heap.

* * * * *

UNITED STATES PATENT AND TRADEMARK OFFICE
CERTIFICATE OF CORRECTION

PATENT NO.       : 7,197,619 B2                                        Page 1 of 1
APPLICATION NO.  : 10/864278
DATED            : March 27, 2007
INVENTOR(S)      : Redestig It is certified that error appears in the above-identified patent and that said Letters Patent is hereby corrected as shown below:

On Title Page,

Item [56] Please Add References Cited:

U.S. Patent Documents:
- --5,659,620    08/19/97    Kuhlman           381/68--
- --5,673,692    10/07/97    Schulze et al.--
- --5,971,931    10/26/99    Raff              600/485--
- --6,556,852    04-2003     Schulze et al.    600/323--

Foreign Patent Documents:
- --WO   00/53094      09/14/00  PCT--
- --DE   3723275 A1    03/31/88  Germany--

Other Documents:
- --International Search Report dated June 3, 2003 for PCT/GB03/00897.--

Signed and Sealed this

Tenth Day of July, 2007

JON W. DUDAS
*Director of the United States Patent and Trademark Office*